March 9, 1926.
G. D. FISH
1,575,983
SURVEYING INSTRUMENT FOR MAPPING SOLID BODIES
Filed Nov. 20, 1920
5 Sheets-Sheet 1
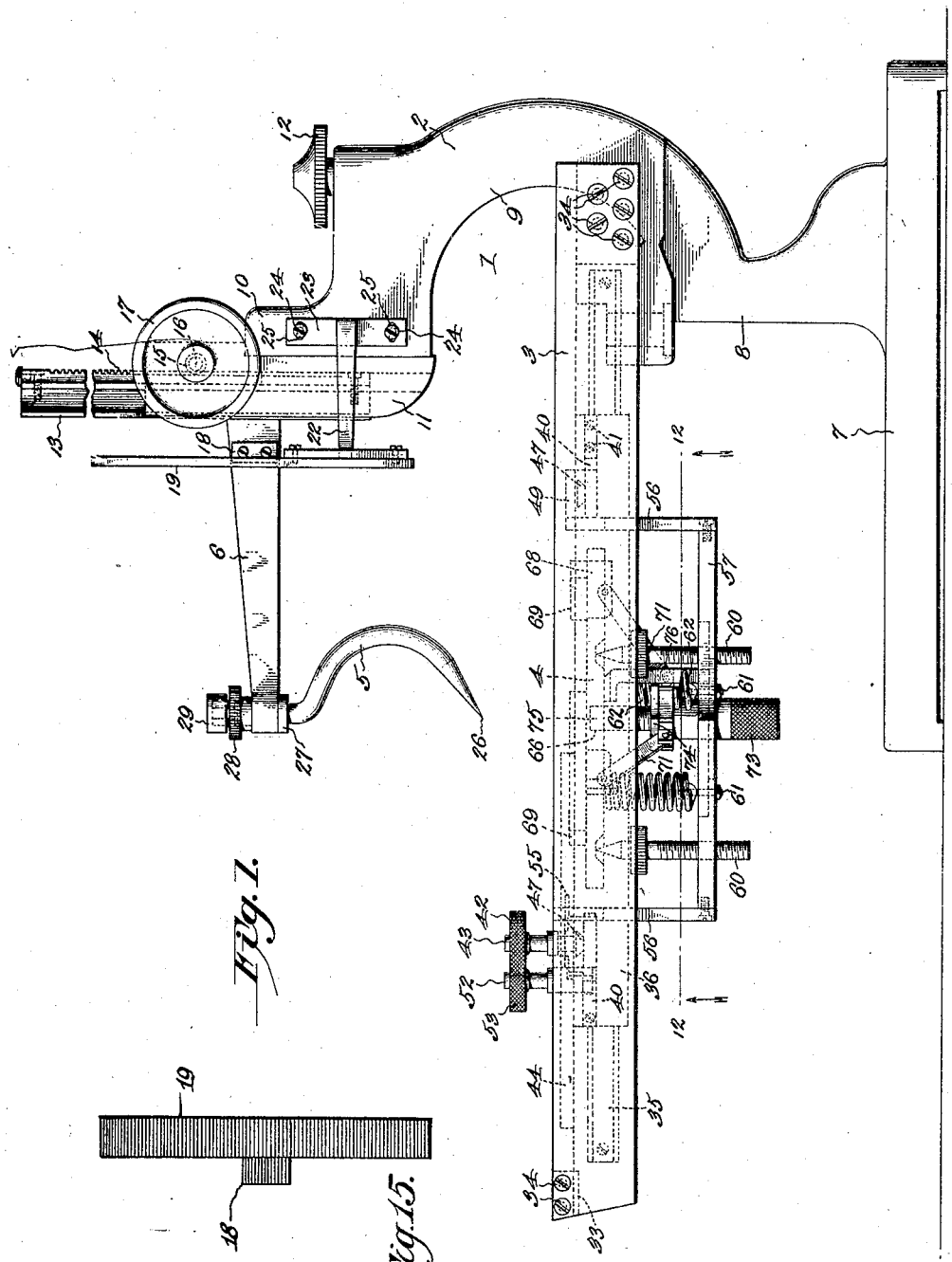
WITNESSES:
INVENTOR
GILBERT D. FISH
BY
ATTORNEY

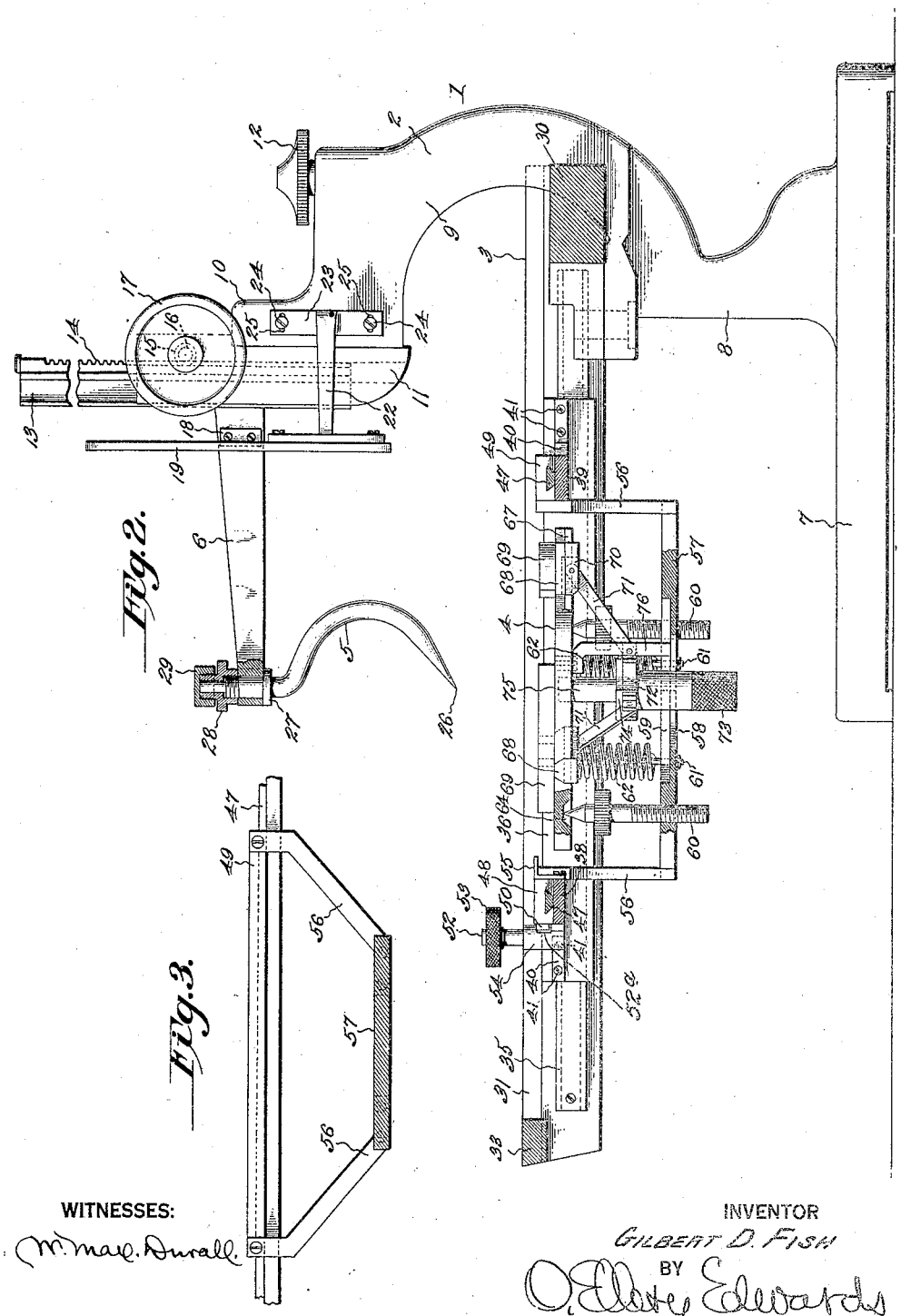

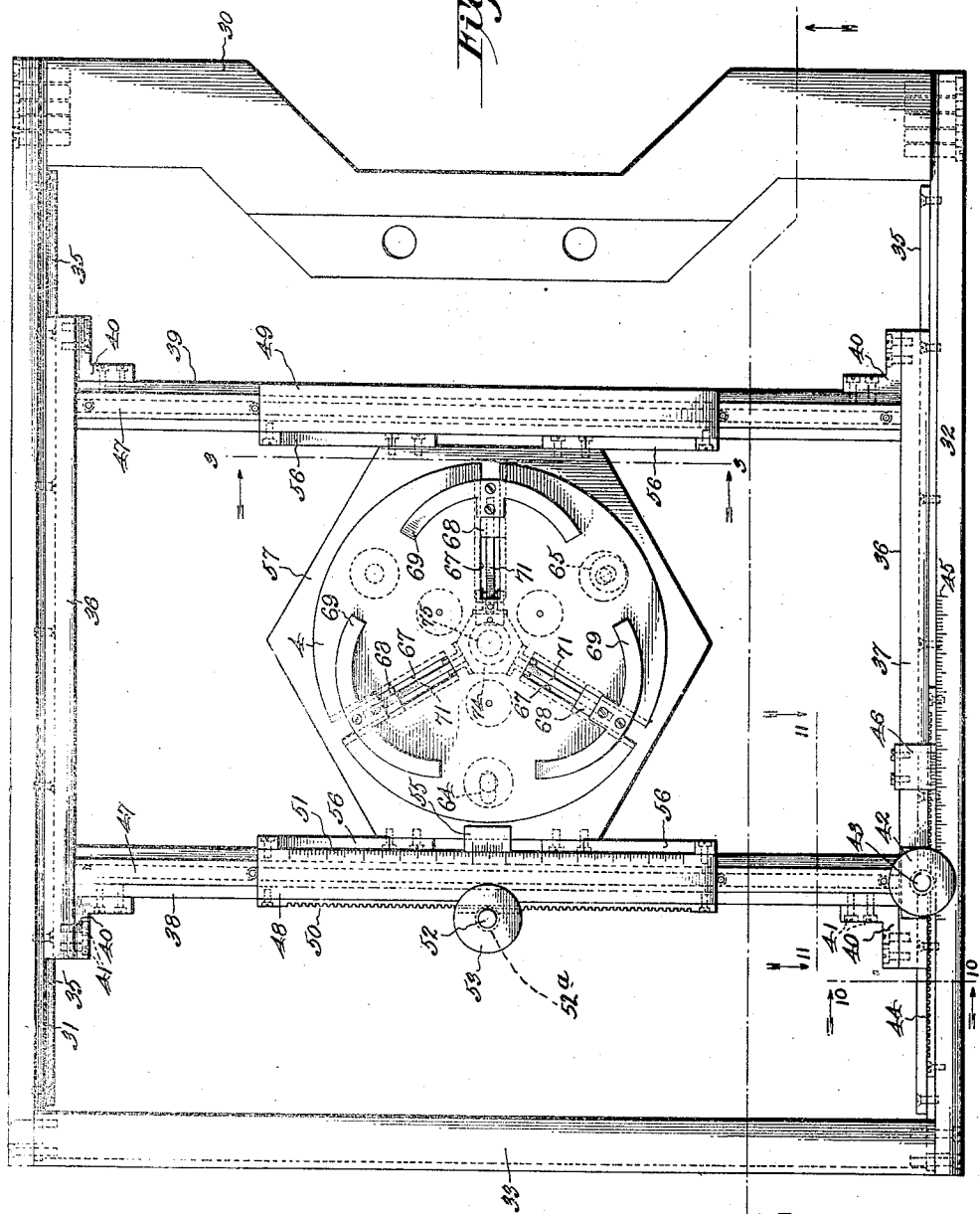

March 9, 1926.     G. D. FISH     1,575,983
SURVEYING INSTRUMENT FOR MAPPING SOLID BODIES
Filed Nov. 20, 1920     5 Sheets-Sheet 4
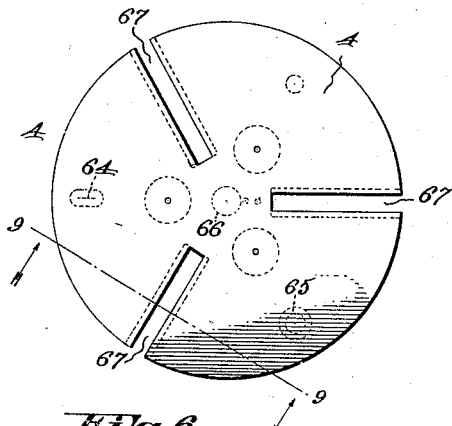
Fig. 5.
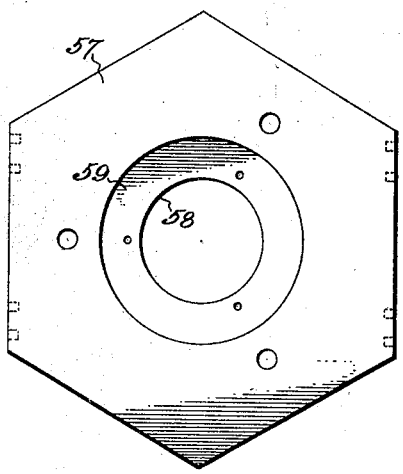
Fig. 7.
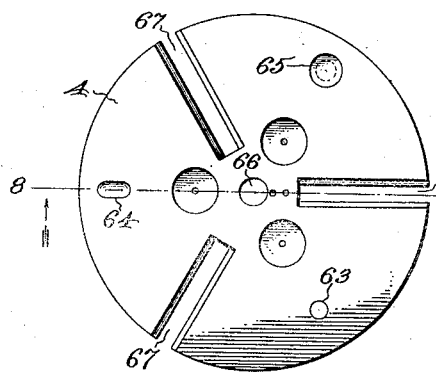
Fig. 6.
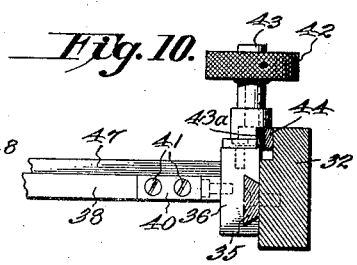
Fig. 10.
Fig. 8.
Fig. 9.
Fig. 11.
WITNESSES:
INVENTOR
GILBERT D. FISH
BY
ATTORNEY March 9, 1926.
G. D. FISH
1,575,983
SURVEYING INSTRUMENT FOR MAPPING SOLID BODIES
Filed Nov. 20, 1920      5 Sheets-Sheet 5
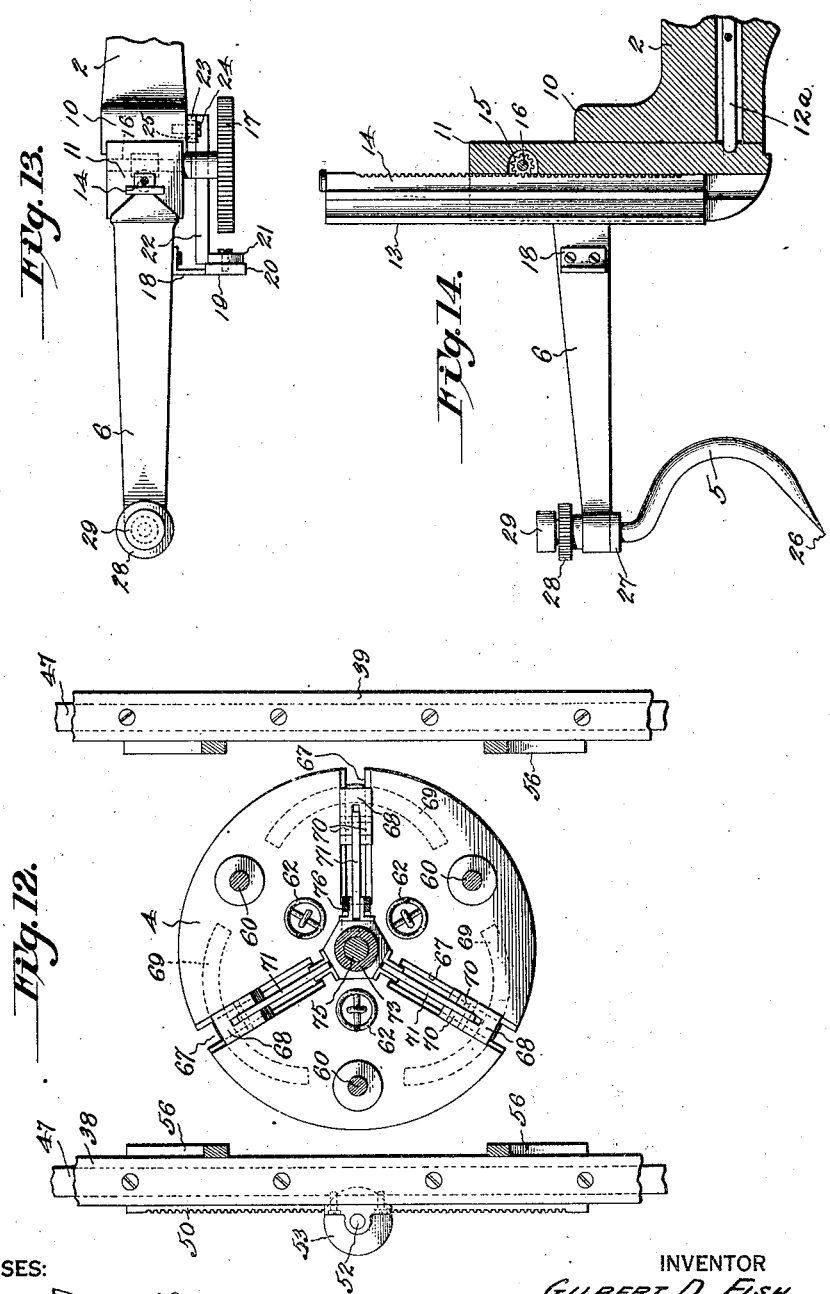
WITNESSES:
INVENTOR
GILBERT D. FISH
BY
ATTORNEY Patented Mar. 9, 1926.

1,575,983

UNITED STATES PATENT OFFICE.

GILBERT D. FISH, OF WASHINGTON, DISTRICT OF COLUMBIA, ASSIGNOR TO FREDERICK L. STANTON, OF NEW YORK, N. Y.

SURVEYING INSTRUMENT FOR MAPPING SOLID BODIES.

Application filed November 20, 1920. Serial No. 425,526.

*To all whom it may concern:*

Be it known that I, GILBERT D. FISH, a citizen of the United States, and a resident of the city of Washington, District of Columbia, have invented a new and useful Improvement in Surveying Instruments for Mapping Solid Bodies, of which the following is a specification.

The object of my invention is to provide an instrument of this class on which a small solid body may be placed, as a dental casting, and then this object may be clamped, shifted and measured in three dimensions so that data may be acquired from which the object may be accurately mapped. This and other objects are accomplished by my invention, one embodiment of which is hereinafter more particularly set forth.

For a more detailed description of my invention, reference is to be had to the accompanying drawings, forming a part hereof, in which Figure 1 is a side elevation of my improved instrument.

Figure 2 is a sectional view taken on the line 2—2 of Figure 4, looking in the direction of the arrows.

Figure 3 is a sectional view taken on the line 3—3 of Figure 4, looking in the direction of the arrows.

Figure 4 is a plan view of the horizontal platform of my improved instrument.

Figure 5 is a plan view of the object carrying head of this instrument, and

Figure 6 is an inverted plan view of the same.

Figure 7 is a plan view of the underframe of this instrument from which the head is supported.

Figure 8 is a sectional view on the line 8—8 of Figure 6, looking in the direction of the arrows.

Figure 9 is a sectional view on the line 9—9 of Figure 5, looking in the direction of the arrows.

Figures 10 and 11 are sectional views on the lines 10—10 and 11—11 respectively, of Figure 4, looking in the direction of the arrows.

Figure 12 is a sectional view on the line 12—12 of Figure 1, looking in the direction of the arrows.

Figure 13 is a plan view of the vertical slide for carrying the indicating point of the apparatus, and Figure 14 is a side elevation of the same with the mounting shown in cross section.

Figure 15 shows a vernier.

Throughout the various views of the drawings, similar reference characters designate similar parts.

My improved measuring device 1 is provided with a stand 2 that carries a horizontal, rectangular platform 3 and on this platform is a movable head 4 that is adapted to carry an object in either of two directions, say longitudinally and laterally, at right angles to each other. Above this head 4 is an indicating point 5 which is carried by a vertically, movable slide that is mounted from the frame 2 in a manner which will be described below. Suitable verniers, three in number, are provided, each being set at right angles to the other two so that it is possible to measure in small units, say one-tenth of a millimeter, in three dimensions. The details of the above will now be set forth.

The stand 2, which is used with my instrument, is an ordinary stand, similar to that used for carrying a microscope and is provided with the usual base 7, upright 8 which at its front carries the platform 3 instead of the usual platform carried by a microscope, and at the rear upper portion of the upright 8 is mounted the conventional neck 9 which has a head 10 which carries the usual slide 11 which may be given the usual micrometer adjustment such as is in common use in microscopes, by means of the screw 12, connected to a lever 12ª, and this guide 11 also carries a slide 13 which is provided with a rack 14 which meshes with a gear 15 which is fixed to a shaft 16 which turns freely in the slide 11 by means of the hand wheel 17 which is of the conventional kind and requires no further explanation. It will be understood from the foregoing, that the slide 13 may be raised or lowered quickly and for a considerable distance through its rack 14, pinion 15 and shaft 16 which is turned by its hand wheel 17 and journaled in the slide 11. For a small adjustment the micrometer 12 is used.

The slide 13 has a projecting arm 6 which has been mentioned above, and this arm is provided with the movable vernier 18 of a scale 19 which has its fixed part 20 graduated in any suitable way, as in millimeters, and carried by a fixed flange 21 at one end of an arm 22 which has a second flange 23 at its other end, which is fixed to the head 10 by screws 24 which preferably rest in elongated slots 25 in the flange 23 so that the arm 22 may be adjusted, if desired.

At its free end the projection 6 is perforated with a truly cylindrical hole in which the point 5 is fitted so that it may turn readily and without lost motion. This point 5 is provided with a pointed lower end 26 which is in the axis of the passage or hole in the arm 6, and it is preferably curved, as indicated, up to a point just below the flange 27 where it assumes a vertical direction so as to fit true within the hole in the arm 6. The upper portion of this pointer 5 is screw threaded to receive a small nut 28 which is surmounted by a cap 29 so that the cap may serve as a lock nut to hold the nut 28 in its desired position, the cap 29 pressing against the upper end of the pointer 5 which projects slightly above the nut 28 under normal conditions, so that the nut will rest true without lost motion on the arm 6, and this arm will extend between this nut and the flange 27 so that the pointer 5 may turn freely.

The amount that the pointer 5 is raised or lowered by the wheels 17 and 12 may be accurately determined by reading the vernier 18 in the conventional manner, and each reading may be systematically recorded so that all altitude levels may be determined and recorded, as above indicated. Means for obtaining the horizontal readings in two directions at right angles to each other and at right angles to the direction of the altitude movement of the point 5 will now be described.

The platform 3 has an end crossing 30 which is shaped so as to fit in place of the ordinary slide platform of the stand 2 and at each end this crossing 30 is provided with side sills 31 and 32 respectively which are connected at their front ends by a second crossing 33. This connection may be had by means of screws 34 or in any other suitable manner. The side sills 31 and 32 are each provided with tracks 35 which are preferably in a dovetailed form, as shown in Figures 10 and 11, to receive the end bars 36 of the sliding frame 37. This sliding frame has, in addition to the end bars 36, the connecting bars 38 and 39 which are connected to the bars 36 by means of the angles 40 and screws 41 which pass through them so that the parts of the sliding frame 37 are held rigid and true at all times. This frame is moved on these rails by means of a small hand wheel 42 fixed to the upper end of a shaft 43 which is journaled in one of the bars 36 and is provided with a pinion 43ª with inclined teeth which meshes with corresponding inclined teeth of the rack 44 which is let into a recess at the top of the sill 32 as shown in Fig. 10. Adjacent to this recess this sill is provided with a scale, as a micrometer scale 45 and adjacent to this the slide 36 carries a vernier slide 46 so that the scale and the vernier slide form a vernier by which readings may be had to a very small dimension, say one tenth of a millimeter.

From the foregoing, it is apparent that by turning the wheel 42 it is possible to move the frame 37 on the tracks 35 longitudinally of the frame 3. Transverse movement is had by means which will now be described.

The connecting bars 38 and 39 are each provided at their respective tops with rails 47 which are preferably made dovetail in cross section to fit corresponding recesses in the slides 48 and 49 which are carried thereby as shown in Fig. 11. The slide 48 carries a rack 50 at its outer edge and a suitable scale, say a millimeter scale 51 at its inner edge. The rack 50 meshes with a pinion 52ª on a shaft 52 which is provided with a hand wheel 53 at its upper end. This shaft 52 is suitably journaled in a bearing 54 which is fixed to the cross bar 38 and a small vernier index 55 is also fixed to this bar with one edge adjacent to the scale 51 so as to form a vernier with this scale in the conventional manner. The slide bars 48 and 49 are connected in a manner which will now be described.

The inner edges of the bars 48 and 49 are provided with downwardly extending hangers 56, four in all, two for each bar, the lower ends of which are secured to the underframe 57 by screws or in any other suitable manner. This underframe is preferably made hexagonal in plan and is provided with a large central perforation 58 within surrounding annular recesses 59 and six additional perforations are provided in this underframe, three of which are screw threaded to receive the adjusting screws 60 which support the head 4, and three for receiving hooks 61 which engage coil springs 62 whose upper ends are connected to the head 4 so that the head is held adjustably and with a proper pressure on the screws 60. It will be apparent from Figures 2 and 6 that the adjusting screws 60 enter recesses of different shapes. One recess 63 is conical in outline, another 64 is elongated so as to have a straight line instead of a point at its bottom, and a third one 65 is shaped like the frustum of a cone. This is for the purpose of having a minimum movement of the head 4 when adjusted and yet have the points of the adjusting screws 60 always resting against the bottoms of their respective recesses 63, 64 and 65.

The head 4 also has a central recess 66 and radial slots 67 which are beveled outwardly on the lower sides to receive slides 68 which have their upper surfaces flush with the upper surface of the head 4, and these slides are surmounted by jaws 69, one jaw to each slide. These jaws and their slides are mounted so as to move smoothly on the head 4, and the jaws are made rough on their concave surfaces so as to grip firmly any object which may be placed between them. The lower surfaces of the slides 68 are provided with ears 70 which receive pivots that carry the spreading arms 71 which have their lower ends pivoted between corresponding ears on a collar 72 which is mounted between a nut 73 and a collar 74 integral with said nut on a screw threaded spindle 75 which has an upper end journaled in the central hole or recess 66 of the head 4. The lower surface of this head is also provided with a suitable guide 76 which forces the collar 72 to move in a vertical direction only so that the same cannot turn or twist when the nut 73 is turned.

*Operation.*

In view of the foregoing, the operation of my improved device will be readily understood. Assuming an object to be surveyed, say a dental arch with teeth is to be in the apparatus, it is first clamped on the head or chuck 4 by adjusting the jaws 69 by turning the nut 73 and then it is properly leveled by turning the leveling screws 60. Thereafter the head 4 may be shifted laterally of the platform 3 by turning the wheel 53 and longitudinally of the platform 3 by turning the wheel 42, and the point 26 may be rested or lowered through the wheels 27 and 12, either or both, so that this point may be brought to any desired location on the casting and when so brought each of the three verniers may be read and the readings recorded, and then the article being surveyed may be slightly shifted to the next point of observation and readings may accurately be charted with correct measurements down to one-tenth of a millimeter, more or less, according to the verniers. After the object is surveyed it may be removed from the apparatus by turning the nut 73 and thereafter a new object may be inserted and measured, as above described.

While I have shown and described one embodiment of my invention, it is obvious that it is not restricted thereto, but that it is broad enough to cover all structures that come within the scope of the annexed claims.

What I claim is:

1. A surveying instrument provided with means for holding a model to be surveyed, means for shifting the model holding means in a plane in two different directions extending at an angle to each other, means for determining the exact amount of such moving in each direction, a pointer adapted to shift perpendicularly with regard to the plane of movement of the model, means for raising or lowering the pointer and means for exactly determining its elevation or change in elevation.

2. A surveying instrument provided with means for holding a model, means for shifting the model holding means longitudinally, means for shifting the model holding means in a plane in two different directions extending at an angle to each other, a pointer and means for shifting the same perpendicularly to the longitudinal and lateral movements of the model so that the model may be surveyed in three dimensions.

3. A surveying instrument provided with movable means for holding a model, leveling means supporting said holding means so that the model may be held in a suitable position, means for shifting the model holder longitudinally and means for shifting the model holder in a plane in two different directions extending at an angle to each other, a pointer and means for shifting the same in connection with the model holding means so that an object on the model holding means may be surveyed.

4. A surveying instrument provided with model holding means, means for shifting the model holding means longitudinally, means for shifting the model holding means in a plane in two different directions extending at an angle to each other, a pointer and means for mounting the same so that it may be shifted at a right angle with regard to the movements of the model holding means, and devices for indicating the movements of the model holder and pointer.

5. A surveying instrument provided with movable means for holding a model which is so arranged and disposed that the model holding means may be shifted in a plane in two different directions extending at an angle to each other, a spindle, a pointer pivotally mounted on this spindle above the model holding means and arranged and disposed so that the spindle has a vertical movement only.

6. A surveying instrument provided with a platform with side sills carrying a frame which is adapted to move longitudinally of and between the sills, means for moving this frame longitudinally of the sills, means for measuring the amount of movement of this frame, a second frame mounted within the first and adapted to move laterally of the sills, means for moving this frame laterally, means for measuring the amount of movement of this frame and means for supporting a model from the laterally moving frame.

7. A surveying instrument provided with a platform with side sills carrying a frame which is adapted to move longitudinally, means for moving this frame longitudinally of the sills, means for measuring the amount of movement of this frame, a second frame mounted within the first and adapted to move laterally of the sills, means for moving this frame laterally, means for measuring the amount of movement of this frame, means for supporting the model from the laterally moving frame and means for leveling the model holding means on the frame.

8. A surveying instrument provided with a platform with side sills carrying a frame which is adapted to move longitudinally of the sills, means for moving this frame longitudinally, means for measuring the amount of movement of this frame, a second frame mounted within the first and adapted to move laterally of the sills, means for moving this frame laterally, means for measuring the amount of movement of this frame and means for supporting a model from the laterally moving frame, said model supporting means consisting of an underframe, a head, screws passing through the underframe and supporting the head, springs connecting the underframe and head and a clamping means on the head for securing the model.

9. A surveying instrument provided with a grooved head, slides in the grooves of the head, clamps secured to the upper surfaces of said slides, links connected to the lower surfaces of said slides and means connected to all of said links for shifting the same in unison, whereby the clamps may be brought against an object supported on the head.

10. A surveying instrument provided with a support, a platform fixed to said support, said platform being provided with two end crossings and side sills all united at their respective ends so as to form a rectangular platform, one of said crossings being adapted to be held to said support and provided with an inwardly extending projection, tracks on the side sills, a longitudinally moving frame carried by said tracks and a transversely movable frame carried by said longitudinally moving frame.

11. A surveying apparatus provided with a frame which is supported at its ends by upwardly extending hangers, a slotted head carried by said frame, screws in said frame carrying the head at their tops, springs connecting the head and frame so as to keep the head on said screws, clamps sliding on and in said head, a screw threaded spindle secured to said head, a nut carried by said spindle, a collar carried by said nut, means for preventing said collar from turning while said nut turns and pivoted links connecting the clamps and collar so that the clamps may be shifted by turning the nut.

In witness whereof, I have hereunto set my hand this 27th day of October, 1920.

GILBERT D. FISH.